United States Patent
Zhang et al.

(10) Patent No.: US 12,497,331 B2
(45) Date of Patent: Dec. 16, 2025

(54) HIGH-STRENGTH PORTLAND CEMENT SLURRY FOR ULTRA-HIGH TEMPERATURE CEMENTING, PREPARATION METHOD THEREFOR AND APPLICATION THEREOF

(71) Applicants: CHINA NATIONAL PETROLEUM CORPORATION, Beijing (CN); CNPC Engineering Technology R&D Company Limited, Beijing (CN)

(72) Inventors: Hua Zhang, Beijing (CN); Jianzhou Jin, Beijing (CN); Yongjin Yu, Beijing (CN); Congfeng Qu, Beijing (CN); Fengzhong Qi, Beijing (CN); Ming Xu, Beijing (CN); Shuoqiong Liu, Beijing (CN); Zhaohui Wang, Beijing (CN); Yuchao Guo, Beijing (CN); Jiliang Liu, Beijing (CN); Bin Lyu, Beijing (CN); Zhiwei Ding, Beijing (CN); Chi Zhang, Beijing (CN); Zishuai Liu, Beijing (CN); Hongfei Ji, Beijing (CN); Xiujian Xia, Beijing (CN); Yong Li, Beijing (CN); Chongfeng Zhou, Beijing (CN); Xiaobing Zhang, Beijing (CN)

(73) Assignees: China National Petroleum Corporation;, Beijing (CN); CNPC Engineering Technology R&D Company Limited, Beijing (CN)

( * ) Notice: Subject to any disclaimer, the term of this patent is extended or adjusted under 35 U.S.C. 154(b) by 330 days.

(21) Appl. No.: 18/315,088

(22) Filed: May 10, 2023

(65) Prior Publication Data

US 2023/0278927 A1 Sep. 7, 2023

Related U.S. Application Data

(63) Continuation of application No. PCT/CN2021/126618, filed on Oct. 27, 2021.

(30) Foreign Application Priority Data

Nov. 20, 2020 (CN) .......................... 202011313439.1

(51) Int. Cl.
C04B 28/04 (2006.01)
C04B 14/06 (2006.01)
C04B 14/10 (2006.01)
C04B 14/46 (2006.01)
C04B 22/14 (2006.01)
C04B 40/00 (2006.01)
C04B 111/00 (2006.01)

(52) U.S. Cl.
CPC .............. *C04B 28/04* (2013.01); *C04B 14/06* (2013.01); *C04B 14/10* (2013.01); *C04B 14/46* (2013.01); *C04B 22/14* (2013.01); *C04B 40/0039* (2013.01); *C04B 2111/00724* (2013.01); *C04B 2201/50* (2013.01)

(58) Field of Classification Search
CPC ......... C04B 28/04; C04B 14/06; C04B 14/10; C04B 14/46; C04B 22/14; C04B 40/0039; C04B 2111/00724; C04B 2201/50; C04B 2103/0028; C09K 8/467; C09K 8/487
See application file for complete search history.

(56) References Cited

U.S. PATENT DOCUMENTS

| 4,676,832 A | * | 6/1987 | Childs | C04B 28/02 |
| | | | | 106/806 |
| 2012/0014812 A1 | | 1/2012 | Blaiklock et al. | |
| 2018/0037795 A1 | * | 2/2018 | Goel | C09K 8/54 |
| 2018/0334880 A1 | | 11/2018 | Jones et al. | |
| 2019/0241792 A1 | * | 8/2019 | Zhang | C04B 24/166 |

FOREIGN PATENT DOCUMENTS

| CN | 102531481 A | | 7/2012 | | |
| CN | 105884239 A | | 8/2016 | | |
| CN | 106986584 A | | 7/2017 | | |
| CN | 107200520 A | | 9/2017 | | |
| CN | 107244857 A | | 10/2017 | | |
| CN | 108298902 A | * | 7/2018 | .............. | C09K 8/487 |
| CN | 108439872 A | | 8/2018 | | |
| CN | 104371678 B | | 9/2018 | | |
| CN | 108623258 A | * | 10/2018 | ........... | C04B 20/023 |
| CN | 108706927 A | | 10/2018 | | |
| CN | 108911618 A | * | 11/2018 | ............... | E04B 2/74 |
| CN | 109437710 A | | 3/2019 | | |
| CN | 109943303 A | | 6/2019 | | |
| JP | H08104556 A | * | 4/1996 | ......... | C04B 40/0039 |
| WO | 2020187742 A1 | | 9/2020 | | |

OTHER PUBLICATIONS

CN109811618A Merge with Machine translation.*

(Continued)

*Primary Examiner* — Pamela H Weiss
(74) *Attorney, Agent, or Firm* — Michael Best & Friedrich LLP

(57) ABSTRACT

A high-strength Portland cement slurry for ultra-high-temperature cementing, a preparation method therefor and an application thereof. In parts by weight, the composition of the cement slurry comprises: 100 parts of Portland cement, 4-6 parts of a high temperature anti-cracking material, 80-105 parts of a high-temperature reinforcing material, 70-78 parts of water, 0.5-1.5 parts of a dispersant, 1-3 parts of a fluid loss reducer, 0.5-2.5 parts of a retarder and 0.2-0.5 parts of a defoamer; the high-temperature reinforcing material is a combination of acid-washed quartz sand, metakaolin and aluminum sulfate, a combination of acid-washed quartz sand, metakaolin, feldspar and sodium sulfate, or a combination of acid-washed quartz sand, metakaolin, feldspar and calcium nitrite. The cement slurry has good settling stability, rapid strength development in low temperatures, high compressive strength of cement stone at a high temperature of 600° C., and stable development of long-term high-temperature compressive strength.

14 Claims, No Drawings

(56) References Cited

OTHER PUBLICATIONS

JPH08104556A Merge with Machine trnalstion.*
Extended European Search Report issued on Feb. 19, 2024 for counterpart European patent application No. 21893705.0 (5 pages).
Decision of Rejection issued on Dec. 2, 2022 for counterpart Chinese patent application No. 202011313439.1, along with EN translation.
First Office Action and search report issued on Jun. 22, 2022 for counterpart Chinese patent application No. 202011313439.1, along with machine EN translation downloaded from EPO.
International Search Report issued for counterpart Chinese patent application No. PCT/CN2021/126618 mailed on Dec. 31, 2021.
Lan Bang et al., Research progress in additives for strength reinforcement of Portland cement, Inorganic Chemicals Industry, 2015, vol. 47, No. 11, pp. 15-19.
Qing Xiong Shan, Practice Guide for Petroleum Engineering borehole, China University of Petroleum Press, No. 1, p. 390, 2011.
Xiuzhen, et al., Composite anti-crack technology of high-performance concrete structure, Jiangsu Building Materials, No. 2, 2009.
Yunlong, et al., Production and application technology of dry-mixed gypsum building materials, China Building Materials Industry Press, vol. 1, 2006.
China Patent Information Center, Search Report dated Nov. 17, 2020 (8 pages, English translation included).
China Patent Information Center, Search Report dated Oct. 29, 2020 (10 pages, English translation included).
China Patent Information Center, Search Report dated Jul. 24, 2020 (10 pages, English translation included).

* cited by examiner

HIGH-STRENGTH PORTLAND CEMENT SLURRY FOR ULTRA-HIGH TEMPERATURE CEMENTING, PREPARATION METHOD THEREFOR AND APPLICATION THEREOF

CROSS-REFERENCE TO RELATED APPLICATIONS

This application is a continuation of International Application No. PCT/CN2021/126618, filed on Oct. 27, 2021, which claims priority to Chinese Patent Application No. 202011313439.1, filed on Nov. 20, 2020, both of which are hereby incorporated by reference in their entireties.

TECHNICAL FIELD

The present disclosure relates to a high-strength Portland cement slurry for ultra-high temperature cementing and a production method and use thereof, and belongs to the technical field of well cementing.

BACKGROUND

For thermal recovery of super heavy oil fire flooding and coalbed gasification, the temperature in the wellbore is 600° C.-1000° C., and ordinary sand-containing cement stone in the well has a loose structure, significantly reduced compressive strength, and increased permeability at high temperature, which seriously affects the annular sealing ability of the cement sheath and greatly shortens the production life of thermal recovery wells for super heavy oil fire flooding and coal gasification wells. Therefore, it is necessary to develop a cement slurry system with high compressive strength of cement stone at high temperature and stable development of long-term compressive strength at high temperature.

At present, Portland cement with quartz sand, aluminate cement and phosphoaluminate cement are mainly used as the cement slurry system for cementing. Although the high temperature compressive strength is higher than that of pure cement slurry, there are still some problems as follows.

(1) The high temperature compressive strength of Portland cement with quartz sand at 600° C. declines very seriously, and the cement sheath tends to lose the interlayer sealing ability.
(2) The price of aluminate cement or phosphoaluminate cement is ten or more times that of Portland cement.
(3) It is difficult to develop admixtures such as fluid loss additive and retarder suitable for aluminate cement or phosphoaluminate cement, while Portland cement has the matching admixtures available.
(4) At present, the use of Portland cement in the cementing industry still occupies the main market, and almost all cementing equipments of each cementing construction unit have contacted Portland cement, while the aluminate cement or phosphoaluminate cement will cause flocculation once contacting Portland cement, which is highly sensitive and tends to cause cementing accidents.
(5) The high temperature compressive strength of cement stone of ordinary Portland cement with quartz sand, aluminate cement and phosphoaluminate cement at 600° C. is less than 20 MPa.

SUMMARY

In view of the above technical problems, the present disclosure aims to provide a cement slurry suitable for cementing at a ultra-high temperature of 600° C., which has the characteristics of good settlement stability, rapid strength development at low temperature, high compressive strength of cement stone at high temperature of 600° C., and stable development of long-term compressive strength at high temperature, and can meet the requirements of field application in thermal recovery wells for super heavy oil fire flooding and coal gasification wells.

In order to achieve the above object, the present disclosure provides a high-strength Portland cement slurry for ultra-high temperature cementing, comprising by weight:

100 parts of Portland cement, 4-6 parts of a high temperature anti-cracking material, 80-105 parts of a high temperature reinforcing material, 70-78 parts of water, 0.5-1.5 parts of a dispersant, 1-3 parts of a fluid loss additive, 0.5-2.5 parts of a retarder, and 0.2-0.5 parts of a defoamer;

wherein the high temperature reinforcing material is a combination of acid-washed quartz sand, metakaolin, and aluminum sulfate in a mass ratio of 25-35:5-15:1, or a combination of acid-washed quartz sand, metakaolin, feldspar, and sodium sulfate in a mass ratio of 25-35:5-15:5-15:1, or a combination of acid-washed quartz sand, metakaolin, feldspar, and calcium nitrite in a mass ratio of 25-35:5-15:5-15:1.

According to a specific embodiment of the present disclosure, the Portland cement may be one or two or more of Grade A, Grade B, Grade C, Grade D, Grade E, Grade F, Grade G, Grade H and Grade J Portland cements for cementing oil and gas wells.

According to a specific embodiment of the present disclosure, the high temperature anti-cracking material may comprise a combination of two materials from basalt fiber, mullite, and sepiolite, and the mass ratio between the two materials is 1-3:1, preferably 1:1.

According to a specific embodiment of the present disclosure, the high temperature reinforcing material is preferably a combination of acid-washed quartz sand, metakaolin, and aluminum sulfate in a mass ratio of 30:10:1, or a combination of acid-washed quartz sand, metakaolin, feldspar, and sodium sulfate in a mass ratio of 30:10:10:1, or a combination of acid-washed quartz sand, metakaolin, feldspar, and calcium nitrite in a mass ratio of 30:10:10:1. The cement slurry of the present disclosure uses the above-mentioned three or four kinds of specific high temperature reinforcing materials with controlled mass ratio thereof, and the prepared cement stone can produce a stable crystal phase resistant to high temperature, so that the high temperature crystal phase structure of the cement stone can be maintained stably, and the strength will not decline but increase after experiencing high temperature.

According to a specific embodiment of the present disclosure, the dispersant may comprise an aldehyde-ketone condensate or a polycarboxylic acid-based dispersant.

According to a specific embodiment of the present disclosure, the fluid loss additive may be an AMPS polymer-based fluid loss additive; specifically, it may be selected from AMPS polymer-based fluid loss additives known in the art according to needs.

According to a specific embodiment of the present disclosure, the retarder may be one or two or more of hydroxyethylidenediphosphonic acid, etidronic acid and ethylenediaminetetramethylenephosphonic acid.

According to a specific embodiment of the present disclosure, the defoamer may be dimethyl silicone and/or tributyl phosphate.

The present disclosure provides a method for producing the high-strength Portland cement slurry for ultra-high temperature cementing, comprising the steps of:
- dry-mixing the high temperature anti-cracking material, the high temperature reinforcing material, the fluid loss additive, the dispersant and the Portland cement uniformly; wet-mixing the retarder, the defoamer and water uniformly; and
- adding the dry mixture to the wet mixture under stirring, and stirring them until uniform to obtain the high-strength Portland cement slurry for ultra-high temperature cementing.

The present disclosure provides use of the high-strength Portland cement slurry for ultra-high temperature cementing in a cementing operation, and preferably, the cementing operation is a cementing operation at 600° C. or higher.

According to a specific embodiment of the present disclosure, in the cementing operation, the high-strength Portland cement slurry may form cement stone after a curing process.

The present disclosure provides a cement slurry suitable for cementing at a ultra-high temperature of 600° C., which has the characteristics of rapid strength development at low temperature, high compressive strength at high temperature of 600° C., and stable development of long-term compressive strength at high temperature. It can effectively ensure the sealing integrity of the cement sheath under the ultra-high temperature, realize good interlayer isolation, prolong the service life of thermal recovery wells for super heavy oil fire flooding and coal gasification wells, and provide a technical support for the long-term, safe and effective operation of thermal recovery wells for super heavy oil fire flooding and coal gasification wells.

The present disclosure has the following beneficial effects, as compared with the prior art.
(1) The upper and lower density difference as the settlement stability of the cement slurry is 0, and the compressive strength of the cement stone at low temperature is greater than 14 MPa, which meets the cementing requirements of thermal recovery wells for super heavy oil fire flooding and coal gasification wells in the early stage.
(2) The long-term compressive strength of the cement stone at high temperature of 600° C. during 130 days exceeds 50 MPa. Moreover, it can maintain a high compressive strength at high temperature of 800° C., and the compressive strength of the cement stone will not decrease, and can be maintained or even increased, after the environment temperature increases.
(3) The materials used in the cement slurry of the present disclosure are all common materials, without special materials. The price of high-strength Portland cement in the present disclosure is 8,000 yuan/ton, and its cost is reduced by about half, as compared with the price of aluminate cement of 15,000 yuan/ton and the price of phosphoaluminate cement of 21,000 yuan/ton.
(4) There is no need to develop admixtures for non-Portland cement separately, which greatly saves the cost of developing admixtures for cement slurry.
(5) The high-strength Portland cement in the present disclosure is based on Grade G Portland cement for cementing oil and gas wells. It does not flocculate or thicken when in contact with Portland cement, has good compatibility, improves the safety of cementing operations, and greatly reduces the cost of cementing operations.

DETAILED DESCRIPTION

In order to have a clearer understanding of the technical features, purposes and beneficial effects of the present disclosure, the technical solutions of the present disclosure will now be described below in details, but it should not be construed as limiting the implementable scope of the present disclosure.

Comparative Example 1

This comparative example provides a cement slurry, composed of the following components by weight:
- 100 parts of Portland cement (Grade G Portland cement for cementing oil and gas wells);
- 4 parts of a high temperature anti-cracking material (basalt fiber:mullite=1:1);
- 102 parts of a high temperature reinforcing material (acid-washed quartz sand:metakaolin:feldspar:sodium sulfate=30:20:10:1);
- 75 parts of fresh water;
- 0.9 part of an aldehyde-ketone condensate dispersant;
- 1.8 parts of an AMPS polymer-based fluid loss additive;
- 0-2.3 parts of a hydroxyethylidenediphosphonic acid retarder;
- 0.3 part of a dimethyl silicone defoamer;
- among them, the specific amount of the hydroxyethylidenediphosphonic acid retarder can be selected according to the requirement on the thickening time for the cement slurry, and the more the retarder is added, the longer the thickening time of the cement slurry is.

The method for producing the cement slurry comprises the following steps:
- the high temperature anti-cracking material, the high temperature reinforcing material, the fluid loss additive, the dispersant and the Portland cement were firstly dry mixed uniformly to obtain a dry mixture;
- then the retarder, the defoamer and fresh water were wet mixed uniformly to obtain a wet mixture;
- finally, the dry mixture was added to the wet mixture under stirring and further stirred uniformly to obtain a high-strength Portland cement slurry for ultra-high temperature cementing having a density of 1.90 g/cm$^3$.

Comparative Example 2

This comparative example provides a cement slurry, composed of the following components by weight:
- 100 parts of Portland cement;
- 4 parts of a high temperature anti-cracking material (basalt fiber:sepiolite=1:1);
- 82 parts of a high temperature reinforcing material (acid-washed quartz sand:metakaolin=30:10);
- 71 parts of fresh water;
- 0.9 part of a polycarboxylic acid-based dispersant;
- 1.8 parts of an AMPS polymer-based fluid loss additive;
- 0-1.8 parts of a hydroxyethylidenediphosphonic acid retarder;
- 0.3 part of a tributyl phosphate defoamer;
- among them, the specific amount of the hydroxyethylidenediphosphonic acid retarder can be selected according to the requirement on the thickening time of the cement slurry, and the more the retarder is added, the longer the thickening time of the cement slurry is.

The method for producing the cement slurry comprises the following steps:

the high temperature anti-cracking material, the high temperature reinforcing material, the fluid loss additive, the dispersant and the Portland cement were firstly dry mixed uniformly to obtain a dry mixture;

then the retarder, the defoamer and fresh water were wet mixed uniformly to obtain a wet mixture;

finally, the dry mixture was added to the wet mixture under stirring and further stirred uniformly to obtain a high-strength Portland cement slurry for ultra-high temperature cementing having a density of 1.90 g/cm³.

Example 1

This example provides a high-strength Portland cement slurry for ultra-high temperature cementing, composed of the following components by weight:

100 parts of Portland cement (Grade G Portland cement for cementing), 4 parts of a high temperature anti-cracking material (basalt fiber:mullite=1:1), 102 parts of a high temperature reinforcing material (acid-washed quartz sand:metakaolin:feldspar:sodium sulfate=30:10:10:1), 75 parts of fresh water, 0.9 part of an aldehyde-ketone condensate dispersant, 1.8 parts of an AMPS polymer-based fluid loss additive, 0-2.3 parts of a hydroxyethylidenediphosphonic acid retarder, 0.3 part of a dimethyl silicone defoamer. The specific amount of the hydroxyethylidenediphosphonic acid retarder can be selected according to the requirement on the thickening time of the cement slurry, and the more the retarder is added, the longer the thickening time of the cement slurry is.

The method for producing the cement slurry comprises the following steps:

the high temperature anti-cracking material, the high temperature reinforcing material, the fluid loss additive, the dispersant and the Portland cement were dry mixed uniformly to obtain a dry mixture;

then the retarder, the defoamer and fresh water were wet mixed uniformly to obtain a wet mixture;

finally, the dry mixture was added to the wet mixture under stirring and further stirred uniformly to obtain a high-strength Portland cement slurry for ultra-high temperature cementing having a density of 1.90 g/cm³.

Example 2

This example provides a high-strength Portland cement slurry for ultra-high temperature cementing, composed of the following components by weight:

100 parts of Portland cement, 4 parts of a high temperature anti-cracking material (basalt fiber:sepiolite=1:1), 82 parts of a high temperature reinforcing material (acid-washed quartz sand:metakaolin:aluminum sulfate=30:10:1), 71 parts of fresh water, 0.9 part of a polycarboxylic acid-based dispersant, 1.8 parts of an AMPS polymer-based fluid loss additive, 0-1.8 parts of a hydroxyethylidenediphosphonic acid retarder, 0.3 part of a tributyl phosphate defoamer. The specific amount of the hydroxyethylidenediphosphonic acid retarder can be selected according to the requirement on the thickening time of the cement slurry, and the more the retarder is added, the longer the thickening time of the cement slurry is.

The method for producing the cement slurry comprises the following steps:

the high temperature anti-cracking material, the high temperature reinforcing material, the fluid loss additive, the dispersant and the Portland cement were firstly dry mixed uniformly to obtain a dry mixture;

then the retarder, the defoamer and fresh water were wet mixed uniformly to obtain a wet mixture;

finally, the dry mixture was added to the wet mixture under stirring and further stirred uniformly to obtain a high-strength Portland cement slurry for ultra-high temperature cementing having a density of 1.90 g/cm³.

Example 3

This example provides a high-strength Portland cement slurry for ultra-high temperature cementing, composed of the following components by weight:

100 parts of Portland cement (Grade G Portland cement for cementing), 4 parts of a high temperature anti-cracking material (basalt fiber:mullite=1:1), 102 parts of a high temperature reinforcing material (acid-washed quartz sand:metakaolin:feldspar:calcium nitrite=30:10:10:1), 75 parts of fresh water, 0.9 part of an aldehyde-ketone condensate dispersant, 1.8 parts of an AMPS polymer-based fluid loss additive, 0-2.3 parts of a hydroxyethylidenediphosphonic acid retarder, 0.3 part of a dimethyl silicone defoamer. The specific amount of the hydroxyethylidenediphosphonic acid retarder can be selected according to the requirement on the thickening time of the cement slurry, and the more the retarder is added, the longer the thickening time of the cement slurry is.

The method for producing the cement slurry comprises the following steps:

the high temperature anti-cracking material, the high temperature reinforcing material, the fluid loss additive, the dispersant and the Portland cement were firstly dry mixed uniformly to obtain a dry mixture;

then the retarder, the defoamer and fresh water were wet mixed uniformly to obtain a wet mixture;

finally, the dry mixture was added to the wet mixture under stirring and further stirred uniformly to obtain a high-strength Portland cement slurry for ultra-high temperature cementing having a density of 1.90 g/cm³.

Test Example 1

The performances of the high-strength Portland cement slurry for cementing provided in Comparative Examples 1 and 2 and Examples 1, 2 and 3 are tested, and the results are shown in Table 1.

The temperature for cementing thermal recovery wells for super heavy oil in the early stage is generally at a low temperature of 50 to 80° C., and the performance of the cement slurry in the early stage is required to meet the requirements of engineering construction. Table 1 provides the test results for conventional performances of the cement slurry, and it is known from the results that the test results for conventional performances of Examples 1, 2 and 3 all meet the requirements of cementing construction of thermal recovery wells for super heavy oil.

TABLE 1

| Performance | Density g/cm$^3$ | Fluidity cm | API fluid loss mL | Free fluid % | Thickening time 70 Bc/min |
|---|---|---|---|---|---|
| Comparative Example 1 | 1.90 | 16 | 22 | 0 | 83-240 min |
| Comparative Example 2 | 1.90 | 23 | 34 | 0 | 79-240 min |
| Example 1 | 1.90 | 21 | 28 | 0 | 67-240 min |
| Example 2 | 1.90 | 22 | 26 | 0 | 55-240 min |
| Example 3 | 1.90 | 22 | 31 | 0 | 61-240 min |

The main difference between Example 1 and Comparative Example 1 lies in the composition and mass ratio of the high-temperature reinforcing materials. It can be seen from the test results in Table 1 that the fluidity of the cement slurry in Comparative Example 1 is too low to meet the engineering construction requirements.

The main difference between Example 2 and Comparative Example 2 lies in that aluminum sulfate is not added to the high temperature reinforcing material in Comparative Example 2. It can be seen from the test results in Table 1 that the conventional performances of the cement slurry of Example 2 meet the engineering construction requirements, while the fluid loss of the cement in Comparative Example 2 is not desirable.

Test Example 2

The performances of the high-strength Portland cement stones for cementing thermal recovery wells for super heavy oil made from the cement slurries in Comparative Examples 1 and 2 and Examples 1, 2 and 3 are tested, respectively, and the results are shown in Table 2.

Curing conditions: filling the prepared cement slurry into the mold for strength, and curing in a high temperature and high pressure curing chamber at 70° C. under 20.7 MPa for 7 days, curing in the high temperature and high pressure curing chamber at 250° C. under 20.7 MPa for 1 day, and then curing in an electric furnace kiln at 600° C. under 0.1 MPa for 30 days, 60 days and 130 days, respectively; during the curing process, the cement slurry will gradually form cement stone.

It can be seen from the contents of Table 2 that in the later stage of cementing, under the high temperature of 600° C. in the construction condition for the thermal recovery well, the cement stones formed from the cement slurries of the Examples of the present disclosure have good performances and effects, the strength is high, and the long-term strength does not decline. At 600° C., the compressive strength of the cement stone formed from the cement slurry of Comparative Example 2 is low, and the long-term strength declines.

Test Example 3

The performances of the high-strength Portland cement stones for cementing thermal recovery wells for super heavy oil made from the cement slurries of Examples 1 and 2 are tested, and the results are shown in Table 3.

Curing conditions: filling the prepared cement slurry into the mold for strength, and curing in a high temperature and high pressure curing chamber at 70° C. under 20.7 MPa for 7 days, curing in the high temperature and high pressure curing chamber under 20.7 MPa at the curing temperature shown in Table 3 for 10 days, 30 days, 60 days and 130 days, respectively; during the curing process, the cement slurry will gradually form cement stone.

TABLE 2

| Performance | Compressive strength after curing at 70° C. under 20.7 Mpa for 7 days, MPa | Compressive strength of cement stone after curing at 600° C. for 10 days, MPa | Compressive strength of cement stone after curing at 600° C. for 30 days, MPa | Compressive strength of cement stone after curing at 600° C. for 60 days, MPa | Compressive strength of cement stone after curing at 600° C. for 130 days, MPa |
|---|---|---|---|---|---|
| Comparative Example 1 | 28.9 | 30.7 | 68.5 | 50.9 | 60.4 |
| Comparative Example 2 | 21.1 | 24.7 | 35.7 | 34.2 | 29.5 |
| Example 1 | 27.7 | 30.4 | 68.7 | 51.7 | 60.9 |
| Example 2 | 25.8 | 29.4 | 67.9 | 60.3 | 61.2 |
| Example 3 | 24.9 | 27.1 | 59.7 | 53.4 | 55.9 |

TABLE 3

| Example | Compressive strength after curing at 70° C. under 20.7 Mpa for 7 days, MPa | Compressive strength of cement stone after curing for 10 days, MPa | Compressive strength of cement stone after curing for 30 days, MPa | Compressive strength of cement stone after curing for 60 days, MPa | Compressive strength of cement stone after curing for 130 days, MPa | High temperature curing temperature |
|---|---|---|---|---|---|---|
| Example 1 | 27.7 | 30.4 | 68.7 | 51.7 | 60.9 | 600° C. |
| Example 1 | 27.7 | 32.8 | / | / | / | 800° C. |

It can be seen from the contents of Table 3 that the strength of the cement stone produced from the cement slurry of Example 1 does not decline but increases after curing at 800° C. for 10 days, which indicates that the cement slurry of the present disclosure allows the prepared cement stone to produce a stable crystal phase resistant to high temperature, so that the high temperature crystal phase structure of the cement stone can be maintained stably, and the strength will not decline but increase after experiencing high temperature.

The invention claimed is:

1. A high-strength Portland cement slurry for ultra-high temperature cementing, comprising by weight:
100 parts of Portland cement, 4-6 parts of a high temperature anti-cracking material, 80-105 parts of a high temperature reinforcing material, 70-78 parts of water, 0.5-1.5 parts of a dispersant, 1-3 parts of a fluid loss additive, 0.5-2.5 parts of a retarder, and 0.2-0.5 parts of a defoamer;
wherein the high temperature reinforcing material is a combination of acid-washed quartz sand, metakaolin, and aluminum sulfate in a mass ratio of 25-35:5-15:1, or a combination of acid-washed quartz sand, metakaolin, feldspar, and sodium sulfate in a mass ratio of 25-35:5-15:5-15:1, or a combination of acid-washed quartz sand, metakaolin, feldspar, and calcium nitrite in a mass ratio of 25-35:5-15:5-15:1.

2. The high-strength Portland cement slurry for ultra-high temperature cementing according to claim 1, wherein the Portland cement is one or two or more of Grade A, Grade B, Grade C, Grade D, Grade E, Grade F, Grade G, Grade H and Grade J Portland cements for cementing oil and gas wells.

3. The high-strength Portland cement slurry for ultra-high temperature cementing according to claim 1, wherein the high temperature anti-cracking material comprises a combination of two materials from basalt fiber, mullite, and sepiolite, and the mass ratio between the two materials is 1-3:1.

4. The high-strength Portland cement slurry for ultra-high temperature cementing according to claim 3, wherein the mass ratio between the two materials constituting the high temperature anti-cracking material is 1:1.

5. The high-strength Portland cement slurry for ultra-high temperature cementing according to claim 2, wherein the high temperature anti-cracking material comprises a combination of two materials from basalt fiber, mullite, and sepiolite, and the mass ratio between the two materials is 1-3:1.

6. The high-strength Portland cement slurry for ultra-high temperature cementing according to claim 5, wherein the mass ratio between the two materials constituting the high temperature anti-cracking material is 1:1.

7. The high-strength Portland cement slurry for ultra-high temperature cementing according to claim 1, wherein the high temperature reinforcing material is a combination of acid-washed quartz sand, metakaolin, and aluminum sulfate in a mass ratio of 30:10:1.

8. The high-strength Portland cement slurry for ultra-high temperature cementing according to claim 1, wherein the high temperature reinforcing material is a combination of acid-washed quartz sand, metakaolin, feldspar, and sodium sulfate in a mass ratio of 30:10:10:1, or a combination of acid-washed quartz sand, metakaolin, feldspar, and calcium nitrite in a mass ratio of 30:10:10:1.

9. The high-strength Portland cement slurry for ultra-high temperature cementing according to claim 1, wherein the dispersant comprises an aldehyde-ketone condensate or a polycarboxylic acid-based dispersant.

10. The high-strength Portland cement slurry for ultra-high temperature cementing according to claim 1, wherein the fluid loss additive is an AMPS polymer-based fluid loss additive.

11. The high-strength Portland cement slurry for ultra-high temperature cementing according to claim 1, wherein the retarder is one or two or more of hydroxyethylidenediphosphonic acid, etidronic acid and ethylenediamine tetramethylene phosphonic acid.

12. The high-strength Portland cement slurry for ultra-high temperature cementing according to claim 1, wherein the defoamer is dimethyl silicone and/or tributyl phosphate.

13. A method for producing the high-strength Portland cement slurry for ultra-high temperature cementing according to claim 1, comprising the steps of:
dry-mixing the high temperature anti-cracking material, the high temperature reinforcing material, the fluid loss additive, the dispersant and the Portland cement uniformly;
wet-mixing the retarder, the defoamer and water uniformly; and
adding the dry mixture to the wet mixture under stirring, and stirring them until uniform to obtain the high-strength Portland cement slurry for ultra-high temperature cementing.

14. A method of a cementing operation, wherein the method uses the high-strength Portland cement slurry for ultra-high temperature cementing according to claim 1,
the cementing operation is a cementing operation at 600° C. or higher;
in the cementing operation, the high-strength Portland cement slurry forms cement stone after a curing process.

* * * * *